(12) United States Patent
Lev et al.

(10) Patent No.: US 8,574,696 B2
(45) Date of Patent: Nov. 5, 2013

(54) ELECTRONIC DEVICE HOUSING ASSEMBLY

(75) Inventors: Jeffrey A. Lev, Cypress, TX (US); Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

(21) Appl. No.: 11/888,407

(22) Filed: Jul. 31, 2007

(65) Prior Publication Data
US 2009/0035549 A1 Feb. 5, 2009

(51) Int. Cl.
- *B32B 1/00* (2006.01)
- *B32B 3/10* (2006.01)
- *B32B 5/02* (2006.01)

(52) U.S. Cl.
USPC .......... 428/36.1; 428/297.4; 428/298.1; 428/299.1; 428/299.4; 428/426; 428/430; 220/4.02

(58) Field of Classification Search
USPC .......... 428/297.4, 298.1, 299.1, 299.4, 426, 428/430, 36.1; 220/4.02
See application file for complete search history.

(56) References Cited

U.S. PATENT DOCUMENTS

| | | | | | |
|---|---|---|---|---|---|
| 3,490,983 | A | * | 1/1970 | Lee | 428/113 |
| 3,686,048 | A | * | 8/1972 | Schirtzinger | 156/161 |
| 4,640,861 | A | * | 2/1987 | Binnersley et al. | 428/298.7 |
| 4,820,568 | A | * | 4/1989 | Harpell et al. | 428/113 |
| 4,874,661 | A | * | 10/1989 | Browne et al. | 442/248 |
| 5,164,255 | A | * | 11/1992 | Weeks | 428/299.1 |
| 5,182,155 | A | * | 1/1993 | Roe | 428/116 |
| 5,260,124 | A | * | 11/1993 | Gaier | 442/219 |
| 5,853,882 | A | * | 12/1998 | Cenedella et al. | 428/379 |
| 6,143,414 | A | * | 11/2000 | Coca et al. | 428/413 |
| 6,231,788 | B1 | | 5/2001 | Patel | |
| 6,248,262 | B1 | | 6/2001 | Kubotera et al. | |
| 6,265,046 | B1 | * | 7/2001 | Swift | 428/88 |
| 6,350,792 | B1 | * | 2/2002 | Smetana et al. | 522/81 |
| 6,428,890 | B1 | | 8/2002 | Ting | |
| 6,540,945 | B2 | | 4/2003 | Kubotera et al. | |
| 6,562,435 | B1 | * | 5/2003 | Stewart et al. | 428/105 |
| 6,596,199 | B2 | | 7/2003 | Patel | |
| 6,660,374 | B2 | * | 12/2003 | Smetana et al. | 428/327 |
| 6,734,262 | B2 | | 5/2004 | Patel | |
| 6,777,095 | B2 | * | 8/2004 | Bunyan et al. | 428/457 |
| 6,808,798 | B2 | * | 10/2004 | Tobita | 428/298.1 |
| 6,844,054 | B2 | * | 1/2005 | Whatley | 428/295.4 |
| 7,699,954 | B2 | * | 4/2010 | Colson et al. | 156/178 |
| 2005/0024835 | A1 | | 2/2005 | Takahashi et al. | |
| 2005/0042457 | A1 | * | 2/2005 | Miller et al. | 428/413 |
| 2005/0287689 | A1 | | 12/2005 | Iwaki et al. | |
| 2006/0078721 | A1 | * | 4/2006 | Rau et al. | 428/298.7 |
| 2006/0110599 | A1 | * | 5/2006 | Honma et al. | 428/413 |
| 2007/0292674 | A1 | * | 12/2007 | Morin | 428/292.1 |
| 2009/0117366 | A1 | * | 5/2009 | Honma | 428/314.8 |

FOREIGN PATENT DOCUMENTS

JP 2004-209717 A 7/2004

OTHER PUBLICATIONS

International Search Report for PCT Application No. PCT/US2008/008357 filing date Jul. 7, 2008.

* cited by examiner

*Primary Examiner* — Michele L Jacobson

(57) ABSTRACT

An electronic device comprising a housing assembly having at least one fiber composite layer molded into a portion of the housing assembly, the at least one fiber composite layer having a warp direction and configured to provide strength to the housing assembly corresponding to the warp direction.

20 Claims, 3 Drawing Sheets

ELECTRONIC DEVICE HOUSING ASSEMBLY

BACKGROUND

Housings for electronic devices are generally formed of molded plastic. However, plastic housings, although lightweight, can sometimes crack and/or break apart from normal wear and tear or if the housing is subjected to a high-level of impact (e.g., being dropped). Some housings incorporate other materials, such as magnesium and/or short, chopped carbon fibers. However, such housings tend to be costly, induce manufacturing variability, and limit the geometry and/or shape into which the housings can be formed.

DETAILED DESCRIPTION OF THE DRAWINGS

Figure 1:
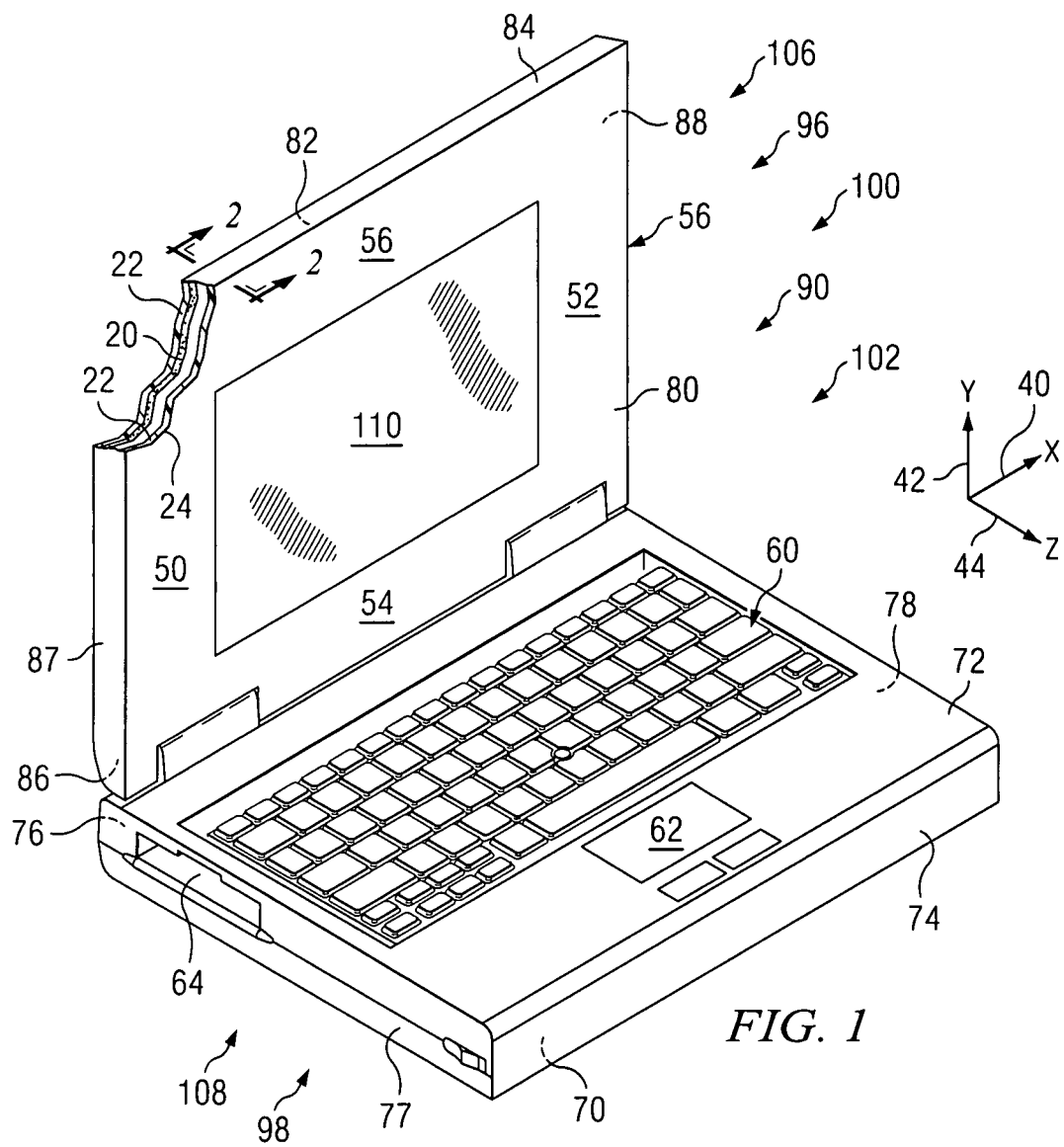
FIG. 1 illustrates an electronic device in which an embodiment of a housing is employed to advantage.

FIG. 1 illustrates an electronic device 100 in which an embodiment of a housing assembly 90 is employed to advantage. In the illustrated embodiment, electronic device 100 is a laptop or notebook computer 104. However, it should be noted that electronic device 100 can be any type of electronic device such as, but not limited to, a desktop computer, a tablet computer, a personal digital assistant (PDA), a telephone, a cellular phone, or any other type of electronic device. In the illustrated embodiment, electronic device 100 comprises a display member 106 rotably coupled to a base member 108. Display member 106 and base member 108 each comprise housings 96 and 98, respectively, for housing and/or supporting one or more components of electronic device 100. For example, in the illustrative embodiment, display member 106 comprises a front wall 80 and a back wall 82 for supporting a display screen 110. Display member 106 also comprises top wall 84, bottom wall 86, and side walls 87 and 88. Base member 108 comprises a bottom wall 70, a working surface 72, a front wall 74, a back wall 76, and side walls 77 and 78. In the embodiment illustrated in FIG. 1, working surface 94 comprises a keyboard 60 and a touchpad 62, and base member 108 comprises interfaces for various user interface components disposed along any of walls 72, 74, 76, 77 and 78 (e.g. optical drive 64 disposed along side wall 77). However, it should be understood that additional and/or different components and/or interfaces may be disposed and/or otherwise reside along walls 72, 74, 76, 77 and 78.

In FIG. 1, a portion and/or section of housing assembly 96 of display member 106 is cut away to illustrate housing assembly 96 comprising a continuous fiber composite 20 integrated and/or combined with a themoplastic resin 22 to form housing assembly 96. Continuous fiber composite 20 is an engineered material having one or more long, filaments and/or fibers disposed in a unidirectional, bidirectional, or other directional configuration in the form of a sheet, tape, cloth, and/or fabric. Continuous fiber composite 20 can be made from one or a combination of materials including, but not limited to copper, boron, titanium, fiberglass, and graphite and may also be preimpregnated with resin. In this context, a "continuous fiber" is a filament and/or fiber of material having some length to reinforce and/or provide strength in selected portions of electronic device 100 (e.g., housing assembly 90). For example, in some embodiments, continuous fiber composite 20 may be used to reinforce and/or provide additional strength to front wall 80 of housing 96 to support display screen 110. It should be understood, however, that walls 82, 84, 86, 87, and 88 of housing 96 and walls 70, 72, 74, 76, 77 and 78 of housing 98 may be similarly configured. It should also be understood that continuous fiber composite 20 may be disposed only in selected portions and/or substantially the entire portion of housing assembly 90. For example, in some embodiments, continuous fiber composite 20 may be disposed along sides 50 and 52 and be absent from sides 54 and 56 of front wall 80.

In some embodiments, continuous fiber composite 20 is a unidirectional fabric 24 (e.g., the fibers disposed entirely or substantially in a single direction) with a primary strength in fabric 24 along the warp direction (e.g., along the length) of the fibers. It should be understood that, depending on the direction of desired reinforcement and/or strength, continuous fiber composite 20 can be disposed and/or oriented along an x-axis 40, a y-axis 42, a z-axis 44, and/or diagonally at any angle in between x-axis 40, y-axis 42, and z-axis 44. In alternative embodiments, continuous fiber composite 20 can be a multidirectional fabric (e.g., fibers disposed bidirectionally, woven, etc.) and configured to provide strength along the warp and fill directions (e.g., in at least two directions). In some embodiments, housing 96 may comprise one or a number of sheets, plys, or layers of continuous fiber composite 20.

Figure 2A:
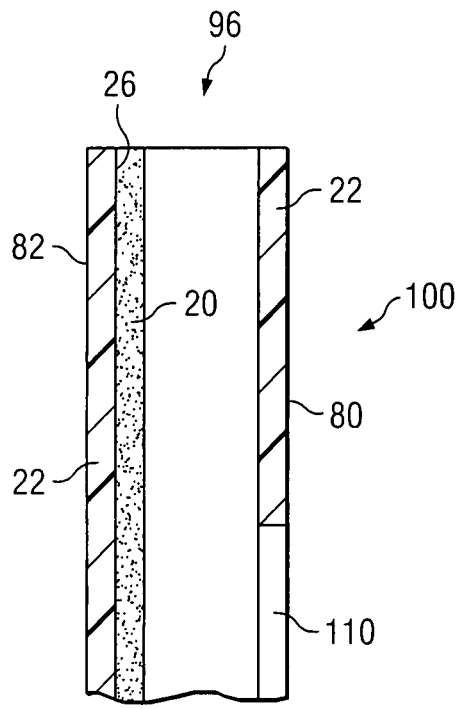
FIGS. 2A, 2B, and 2C illustrate different embodiments of a cross-sectional view of the housing of FIG. 1 taken along line 2-2 of FIG. 1.
Figure 2B:
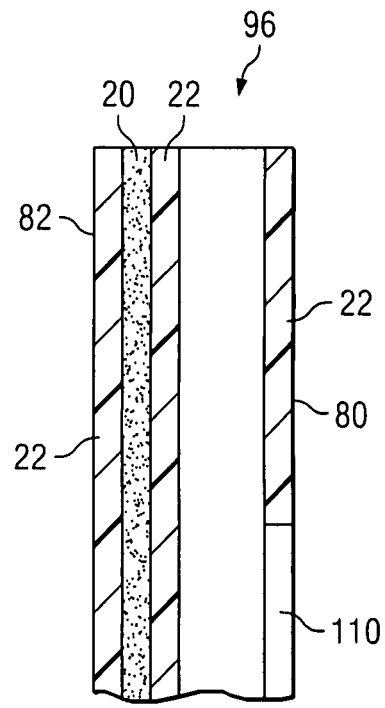
Figure 2C:
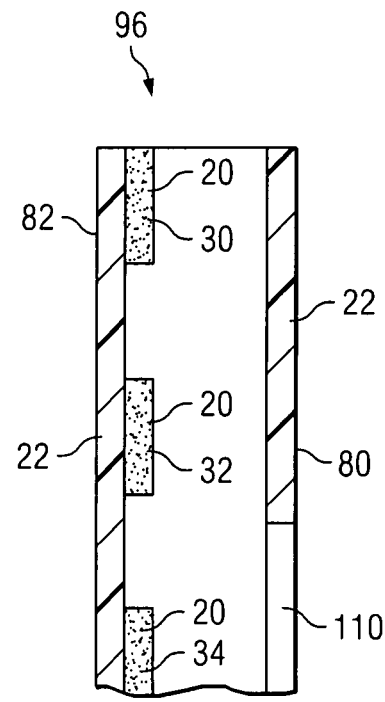

FIGS. 2A, 2B, and 2C illustrate different embodiments of a cross-sectional view of housing 96 of electronic device 100 taken along line 2-2 of FIG. 1. In FIGS. 2A, 2B and 2C, housing assembly 90 is described in connection with housing 96. It should be understood that housing 98 may be similarly configured. In FIGS. 2A, 2B, and 2C, continuous fiber composite 20 is molded into and/or integrated with thermoplastic elastomer 22, thereby forming back wall 82 of housing 96.

In FIG. 2A, one or more layers of continuous fiber composite 20 is applied and/or laid onto an internal surface 26 of a thermoplastic elastomer 22 that has been cured and/or preformed into the shape of back wall 82. An "internal" surface as used herein is an inside and/or interior surface and/or portion of a housing (e.g., housing 96) of electronic device 100. A ply of adhesive may be placed between elastomer 22 and the layer(s) of composite 22. Continuous fiber composite 20 is then cured to enable continuous fiber composite 20 to provide reinforcement and/or strength to back wall 82.

In FIG. 2B, one or more layers of continuous fiber composite 20 is disposed and/or located in a mold cavity of an injection molding tool. In this embodiment, a thermoplastic resin (e.g., thermoplastic elastomer 22) is then injected into the injection molding tool, thereby enabling continuous fiber composite 20 to be integrated and/or embedded in thermoplastic elastomer 22. Heat and pressure is then applied to the injection molding tool to cure composite 20 and elastomer 22 to form back wall 82.

In FIG. 2C, one or more layers of continuous fiber composite 20 is selectively applied and/or laid onto a pre-shaped and/or pre-formed back wall 82. In this embodiment, continuous fiber composite 20 is selectively applied to different, spaced-apart locations/positions 30, 32, and 34 along back wall 82. It should be understood that continuous fiber composite 20 can also be selectively disposed and/or located in a mold cavity of an injection molding tool, thereby enabling continuous fiber composite 20 to be integrated and/or embedded in selected portions of back wall 82 (e.g., integrated with elastomer 22). It should also be understood that continuous fiber composite 20 can be selectively disposed and/or located along any portion and in fewer or greater portions of back wall 82.

Figure 3:
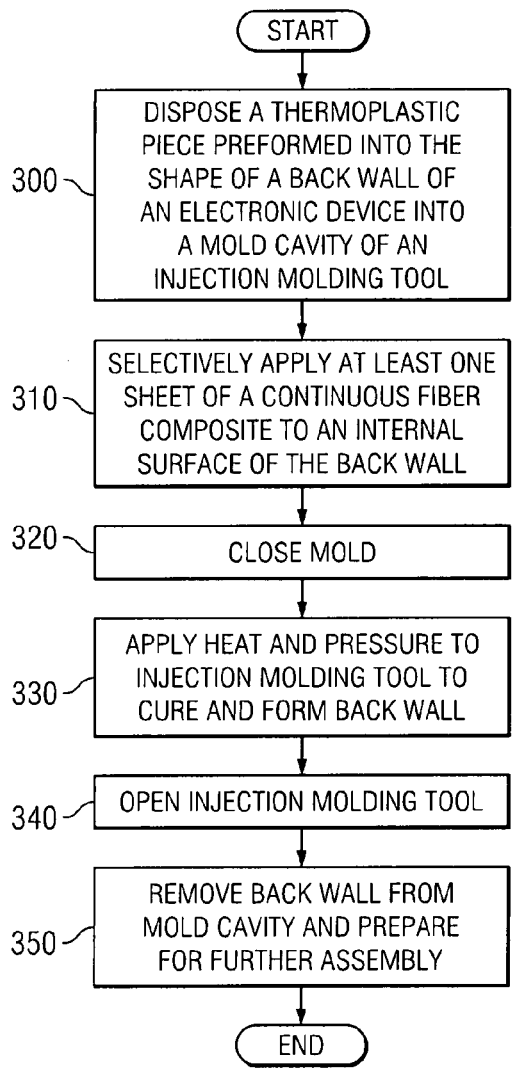
FIG. 3 is a flowchart illustrating an embodiment for a method of manufacturing a housing for an electronic device.

FIG. 3 is a flowchart illustrating an embodiment for a method of manufacturing housing assembly 90 (e.g., back wall 82) for an electronic device 100. The method begins with block 300 where thermoplastic elastomer pre-formed and/or cured into the shape of back wall 82 of electronic device 100 is disposed in a mold cavity. In this embodiment, the mold cavity is used to form back wall 82; however, it should be understood that the mold cavity can be used to form any component for electronic device 100. At least one layer of continuous fiber composite 20 is selectively applied to an internal surface of back wall 82 (block 310). The mold cavity is then closed (block 320) and heat and pressure is applied to the injection molding tool to cure composite 20 and further form back wall 82 (block 330). The injection molding tool is then opened (block 340). Back wall 82 is then removed from the mold cavity and prepared for further assembly in electronic device 100 (block 350). The method terminates thereafter.

Figure 4:
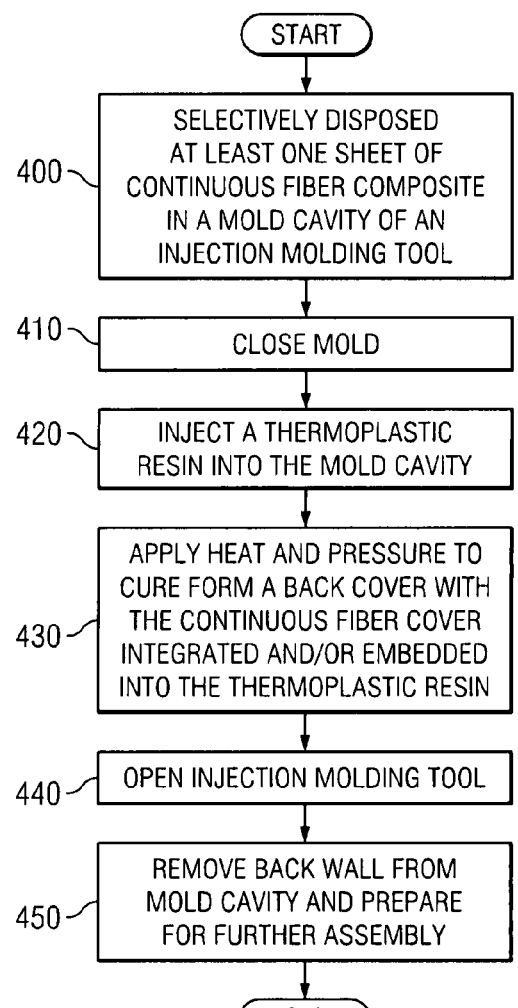
FIG. 4 is a flowchart illustrating another embodiment for a method of manufacturing a housing for an electronic device.

FIG. 4 is a flowchart illustrating another embodiment for a method of manufacturing housing assembly 90 (e.g., back wall 82) for an electronic device 100. The method begins with block 400 where at least one layer of continuous fiber composite 20 is selectively disposed in a mold cavity of an injection molding tool. In this embodiment, the mold cavity is used to form back wall 82; however, it should be understood that the mold cavity can be used to form any component for electronic device 100. The mold cavity is then closed (block 410) and a thermoplastic resin (e.g. thermoplastic elastomer 22) is injected into the mold cavity (block 420). Heat and pressure is then applied to the mold cavity to cure elastomer 22 and composite 20 to form back cover 82 with continuous fiber composite 20 integrated and/or embedded into the thermoplastic resin 22 (block 430). The injection molding tool is then opened (block 440). Back wall 82 is removed from the mold cavity and prepared for further assembly in electronic device 100 (block 450). The method terminates thereafter.

Thus, embodiments of electronic device 100 comprise a housing having at least one layer of continuous fiber composite 20 selectively integrated into housing assembly 90 for electronic device 100. Continuous fiber composite 20 can be configured and/or disposed to provide reinforcement and/or strength to sustain a torsional and/or lateral force applied to housing assembly 90 of electronic device 100. Continuous fiber composite 20 can be selectively disposed and/or located in particular areas of the housing which need to be reinforced. Continuous fiber composite 20 can also be formed into a variety of different pieces and/or portions of the housing for electronic device 100.

What is claimed is:

1. An electronic device, comprising:
a base member; and
a display member rotatably coupled to the base member, the display member including a front wall to support a display screen and a back wall, the back wall including a layer of thermoplastic resin and a layer of fiber composite material applied to the layer of thermoplastic resin, wherein the layer of fiber composite material comprises a plurality of discrete portions of the fiber composite material provided at spaced intervals along an internal surface of the layer of thermoplastic resin.

2. The electronic device of claim 1, wherein the layer of fiber composite material is disposed in a mold cavity, and the thermoplastic resin is injected into the mold cavity to enable the layer of fiber composite material to be integrated with select portions of the thermoplastic resin and then cured to form the back wall.

3. The electronic device of claim 1, wherein the layer of fiber composite material comprises a multidirectional fiber composite layer.

4. The electronic device of claim 1, wherein the plurality of discrete portions of the fiber composite material are positioned at spaced-apart locations along the internal surface of the layer of thermoplastic resin.

5. The electronic device of claim 1, wherein the plurality of discrete portions of the fiber composite material form noncontiguous portions on the internal surface of the layer of thermoplastic resin.

6. The electronic device of claim 1, wherein the layer of fiber composite material is positioned between the layer of thermoplastic resin and the front wall of the display member.

7. The electronic device of claim 1, wherein the layer of fiber composite material comprises at least one of a fiberglass filament, a graphite fiber filament, a titanium fiber filament, and a boron fiber filament.

8. A method of manufacturing an electronic device, comprising:
disposing a fiber composite material in a mold cavity of an injection molding tool;
injecting a thermoplastic elastomer into the injection molding tool; and
applying heat and pressure to the injection molding tool to cure the fiber composite material and the thermoplastic elastomer, and integrate the fiber composite material with the thermoplastic elastomer to form a back wall of a display member for the electronic device, wherein the back wall comprises a plurality of discrete portions of the fiber composite material provided at spaced intervals along a surface of the thermoplastic elastomer.

9. The method of claim 8, wherein the electronic device is a notebook computer.

10. The method of claim 8, wherein the fiber composite material comprises a multidirectional fiber composite material.

11. The method of claim 8, wherein the plurality of discrete portions of the fiber composite material are integrated with select portions of the thermoplastic elastomer to form the back wall of the display member.

12. The method of claim 8, wherein the plurality of discrete portions of the fiber composite material form noncontiguous portions on an internal surface of the back wall of the display member.

13. The method of claim 8, wherein the thermoplastic elastomer forms an external surface of the back wall of the display member.

14. The method of claim 8, wherein the fiber composite material comprises at least one of a fiberglass filament, a graphite fiber filament, a titanium fiber filament, and a boron fiber filament.

15. An electronic device, comprising:
a base member; and
a display member rotatably coupled to the base member, the display member including front wall to support a display screen and a back wall, the back wall including a thermoplastic elastomer layer and a plurality of noncontiguous fiber composite portions selectively positioned along a surface of the thermoplastic elastomer layer.

16. The electronic device of claim 15, wherein each of the plurality of noncontiguous fiber composite portions includes a plurality of multidirectionally disposed filaments.

17. The electronic device of claim 15, wherein the thermoplastic elastomer layer forms an external surface of the back wall, and the plurality of noncontiguous fiber composite portions are selectively positioned along an internal surface of the back wall.

18. The electronic device of claim 15, wherein the plurality of noncontiguous fiber composite portions are disposed in a mold cavity, and thermoplastic elastomer is injected into the mold cavity to integrate the plurality of noncontiguous fiber composite portions with the thermoplastic elastomer and form the back wall.

19. The electronic device of claim 15, wherein the plurality of noncontiguous fiber composite portions are cured concurrently with the thermoplastic elastomer layer to form the back wall.

20. The electronic device of claim 15, wherein the plurality of noncontiguous fiber composite portions are provided at spaced intervals along the surface of the thermoplastic elastomer layer.

\* \* \* \* \*

UNITED STATES PATENT AND TRADEMARK OFFICE
CERTIFICATE OF CORRECTION

PATENT NO.           : 8,574,696 B2                                                  Page 1 of 1
APPLICATION NO.      : 11/888407
DATED                : November 5, 2013
INVENTOR(S)          : Jeffrey A. Lev et al.

It is certified that error appears in the above-identified patent and that said Letters Patent is hereby corrected as shown below:

In the Claims

In column 4, line 62, in Claim 15, delete "including" and insert -- including a --, therefor.

Signed and Sealed this
Fourth Day of March, 2014

Michelle K. Lee
*Deputy Director of the United States Patent and Trademark Office*